United States Patent
West, Jr.

(10) Patent No.: US 6,194,078 B1
(45) Date of Patent: *Feb. 27, 2001

(54) HARDENED WOOD FLOORING PRODUCT

(75) Inventor: William O. West, Jr., Oneida, TN (US)

(73) Assignee: Triangle Pacific Corp., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/241,878

(22) Filed: Feb. 2, 1999

Related U.S. Application Data

(63) Continuation of application No. 08/798,483, filed on Feb. 10, 1997, now Pat. No. 5,866,270.

(51) Int. Cl.⁷ ............................ B32B 23/08; B32B 27/10; B32B 21/04
(52) U.S. Cl. ...................... 428/507; 428/511; 428/537.1; 428/541
(58) Field of Search ................................ 428/541, 537.1, 428/507, 511

(56) References Cited

U.S. PATENT DOCUMENTS

| | | |
|---|---|---|
| 3,874,908 | 4/1975 | Liddell . |
| 4,678,715 | 7/1987 | Giebeler et al. . |
| 4,992,307 | 2/1991 | Ikeda . |
| 5,344,873 * | 9/1994 | Blum ..................................... 524/591 |
| 5,534,305 * | 7/1996 | Fujiki et al. .......................... 427/393 |
| 5,609,915 | 3/1997 | Fuller et al. . |
| 5,652,023 | 7/1997 | Bergervoet et al. . |
| 5,755,068 * | 5/1998 | Ormiston ............................. 52/314 |

\* cited by examiner

Primary Examiner—Paul Thibodeau
Assistant Examiner—Holly C. Rickman
(74) Attorney, Agent, or Firm—Adams, Schwartz & Evans, P.A.

(57) ABSTRACT

A hardened wooden flooring product is produced by impregnating wooden flooring blanks with a hardener while the wooden flooring blanks are in a bundle, wherein the bundled hardened wooden flooring blanks have improved separation characteristics following completion of the impregnation treatment. The flooring product is made by assembling a plurality of wooden flooring product blanks into a bundle of blanks in surface-to-surface contact with each other and enclosing the wooden flooring blanks in a pressure vessel. The pressure vessel is evacuated and an effective quantity of a hardening composition for being impregnated into the wooden flooring blanks is introduced into the pressure vessel. An effective quantity of a polyethylene glycol composition is introduced into the pressure vessel. The wooden flooring blanks are soaked in the hardening composition and the polyethylene glycol composition for a predetermined period of time. Increased pressure is applied to the wooden flooring blanks to drive the hardening composition and the polyethylene glycol composition into the wooden flooring blanks. The impregnated flooring blanks separate from each other without damage to the exposed surfaces. Stability of the blanks from which the flooring product is produced is enhanced.

9 Claims, 2 Drawing Sheets

HARDENED WOOD FLOORING PRODUCT

This application is a 1.53(b) continuation of U.S. Ser. No. 08/798,483 filed on Feb. 10, 1997 now U.S. Pat. No. 5,866,270. This invention relates to a method of hardening wooden flooring blanks in bundles in such a manner as to permit easy separation of the blank after the hardening processing is completed. The invention has application in the production of hardwood flooring, such as slats, planks and parquet blocks, out of hardwoods such as oak and maple. Finished hardwood flooring products of this type are typically installed by embedding the individual strips or blocks in a mastic-type adhesive on a subfloor.

TECHNICAL FIELD AND BACKGROUND OF THE INVENTION

The invention can be used with solid wood and with thin veneers of such woods. For purposes of illustrating the invention of this application, principal emphasis will be placed on the method of hardening veneers of oak and maple, although other species of wood can be treated, as well.

Applicant's process of manufacturing hardwood flooring includes the steps of forming veneers of about 1/10 inch in thickness, and then adhering the veneer strips to spaced-apart backing blocks or to solid core materials. The side-to-side spaces between the adjacent blocks provide flexibility to the finished flooring strip while permitting the use of inferior grades of wood for the hidden base portions of the product. The veneer surfaces are substantially blemish-free and when finished form the exposed, decorative surface.

The attractiveness and wear resistance of the flooring strips can be enhanced by hardening the veneers before adhering them to the backing blocks. This process involves forming a closely and densely-stacked bundles of veneer blanks which are loaded into a reactor vessel where the blanks are exposed to a solution containing monomethylmethacrylate ("MMA"). Bundling of the blanks greatly increases the quantity of blanks which can be processed during a single cycle.

Vacuum and pressure conditions are used to impregnate the MMA into the cell structure of the blanks. When cured, the blank is substantially more wear and damage resistant without affecting the attractiveness, natural appearance and other desirable characteristics of the product. Dyes may be used during this process to achieve desired finish colors in the blanks.

One problem observed during this process is the tendency of the blanks to stick together so that they must be manually separated. This causes damage to the surface and renders the blank unsuitable for use. In addition, hardening the blanks while bundled can also cause warping and splitting. These problems occur variably, but tend to be more prononuced with maple than with oak—two common hardwood flooring woods.

One procedure which reduced the sticking somewhat was sandwiching alternate blanks of oak and maple in the bundle, since oak and maple tend to stick to itself more readily than to each other. However, alternating the blanks and then separating them back into respective sets of oak and maple blanks is very labor intensive, and creates difficulties in producing the proper proportions of oak and maple in needed colors.

It has been determined that the use of Polyethylene Glycol ("PEG") in a blend with the MMA substantially reduces the tendency of the flooring blanks to stick together during the hardening process. The process also enhances the stability of the blanks, thus reducing the tendency of the blanks to crack, warp, split, cup and crown.

SUMMARY OF THE INVENTION

Therefore, it is an object of the invention to provide a method of hardening wooden flooring blanks which utilizes Polyethylene Glycol ("PEG") in a blend with a monomethylmethacrylate ("MMA") hardener to substantially reduce the tendency of bundled flooring blanks to stick together after the hardening method is completed.

It is another object of the invention to provide a method which reduces cracking, warping, splitting, cupping and crowning in wooden flooring blanks and in the end product.

It is another object of the invention to provide a method which reduces cracking, warping, splitting, cupping and crowning in wooden flooring blanks and in the end product, while hardening the flooring blank during the same process.

It is another object of the invention to provide a wooden flooring blank and a finished hardwood flooring product produced according to the method of the application.

These and other objects of the present invention are achieved in the preferred embodiments disclosed below by providing a method of hardening wooden flooring blanks by impregnating the wooden flooring blanks with a hardener while the wooden flooring blanks are in a bundle, wherein the bundled hardened wooden flooring blanks have improved separation characteristics following completion of the impregnation treatment. The method includes the steps of assembling a plurality of wooden flooring product blanks into a bundle of blanks in surface-to-surface contact with each other and enclosing the wooden flooring blanks in a pressure vessel. The pressure vessel is evacuated and an effective quantity of a hardening composition for being impregnated into the wooden flooring blanks is introduced into the pressure vessel. An effective quantity of a polyethylene glycol composition is introduced into the pressure vessel. The wooden flooring blanks are soaked in the hardening composition and the polyethylene glycol composition for a predetermined period of time. Increased pressure is applied to the wooden flooring blanks to drive the hardening composition and the polyethylene glycol composition into the wooden flooring blanks.

According to one preferred embodiment of the invention, the step of soaking the wooden flooring blanks in the hardening composition and the polyethylene glycol composition for a predetermined period of time is carried out at greater than atmospheric pressure.

According to another preferred embodiment of the invention, the soaking step includes a first soaking step at ambient pressure and a second soaking step at greater than atmospheric pressure.

According to yet another preferred embodiment of the invention, the method includes the step of removing the hardening composition and the polyethylene glycol composition from the vessel before applying increased pressure to the wooden flooring blanks.

According to yet another preferred embodiment of the invention, the method includes the application of heat to the wooden flooring blanks along with the increased pressure.

According to yet another preferred embodiment of the invention, the hardener is a monomethylmethacrylate curable upon exposure to heat.

According to yet another preferred embodiment of the invention, the wooden flooring blanks comprise blanks chosen from the group consisting of parquet blocks, veneer strips and solid wood.

According to yet another preferred embodiment of the invention, the wooden flooring blanks comprise blanks chosen from the group consisting of oak and maple.

According to yet another preferred embodiment of the invention, the method includes the step of introducing a wood stain into the pressure vessel with the hardening composition for staining the wood blank while they are hardened.

According to yet another preferred embodiment of the invention, a method of hardening wooden flooring blanks by impregnating the wooden flooring blanks with a hardener while the wooden flooring blanks are in a bundle is provided, wherein the bundled hardened wooden flooring blanks have improved separation characteristics following completion of the impregnation treatment. The method includes the steps of assembling a plurality of wooden flooring product blanks into a bundle of blanks in surface-to-surface contact with each other, enclosing the wooden flooring blanks in a pressure vessel, evacuating the pressure vessel, and introducing into the vessel a blended hardening composition comprising a catalyst and an effective quantity of a catalyst-curable monomethylmethacrylate for being impregnated into the wooden flooring blanks and an effective quantity of a polyethylene glycol composition. The method also includes the steps of soaking the wooden flooring blanks in the blended hardening composition for a predetermined period of time, draining the hardening composition from the pressure vessel, applying pressure to the wooden flooring blanks to drive the hardening composition and the polyethylene glycol composition into the wooden flooring blanks; applying heat to the wooden flooring blanks to accelerate the catalyst to thereby cure the monomethylmethacrylate, and removing the bundle of wooden flooring blanks from the pressure vessel, whereby the wooden flooring blanks have increased hardness while easily and cleaning separating from the bundle without damage of the wooden flooring blanks.

According to one preferred embodiment of the invention, the method includes the step of introducing into the vessel the blended hardening composition includes the step of pressurizing the pressure vessel to a first predetermined pressure.

According to another preferred embodiment of the invention, the wooden flooring blanks comprise blanks chosen from the group consisting of parquet blocks, veneer strips and solid wood.

According to yet another preferred embodiment of the invention, the wooden flooring blanks comprise blanks chosen from the group consisting of oak and maple.

According to yet another preferred embodiment of the invention, the method includes the step of introducing a wood stain into the pressure vessel with the hardening composition for staining the wood blanks while they are hardened.

The products according to the invention include a wooden flooring blank and a finished hardwood flooring product produced according to the method of the application.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
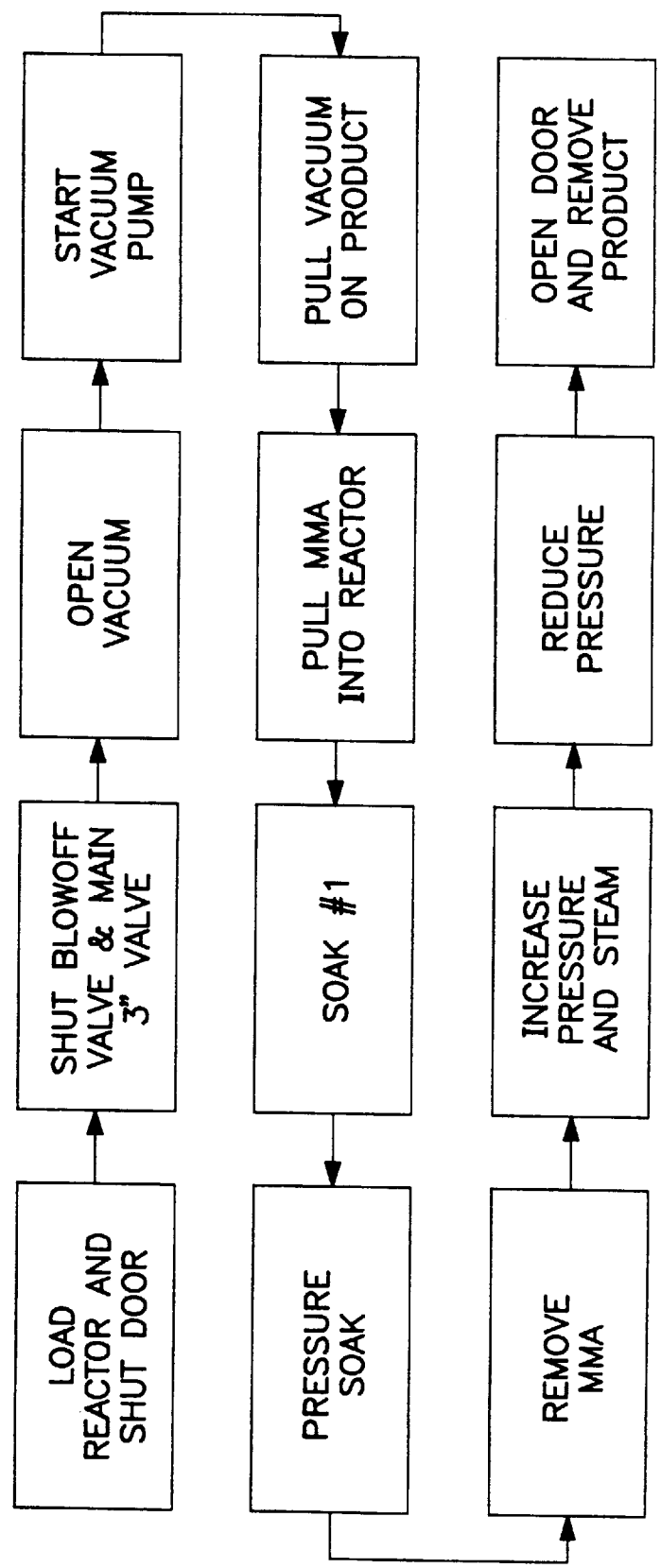
FIG. 1 is a flow diagram of a preferred embodiment of the method according to the invention.
Figure 2:
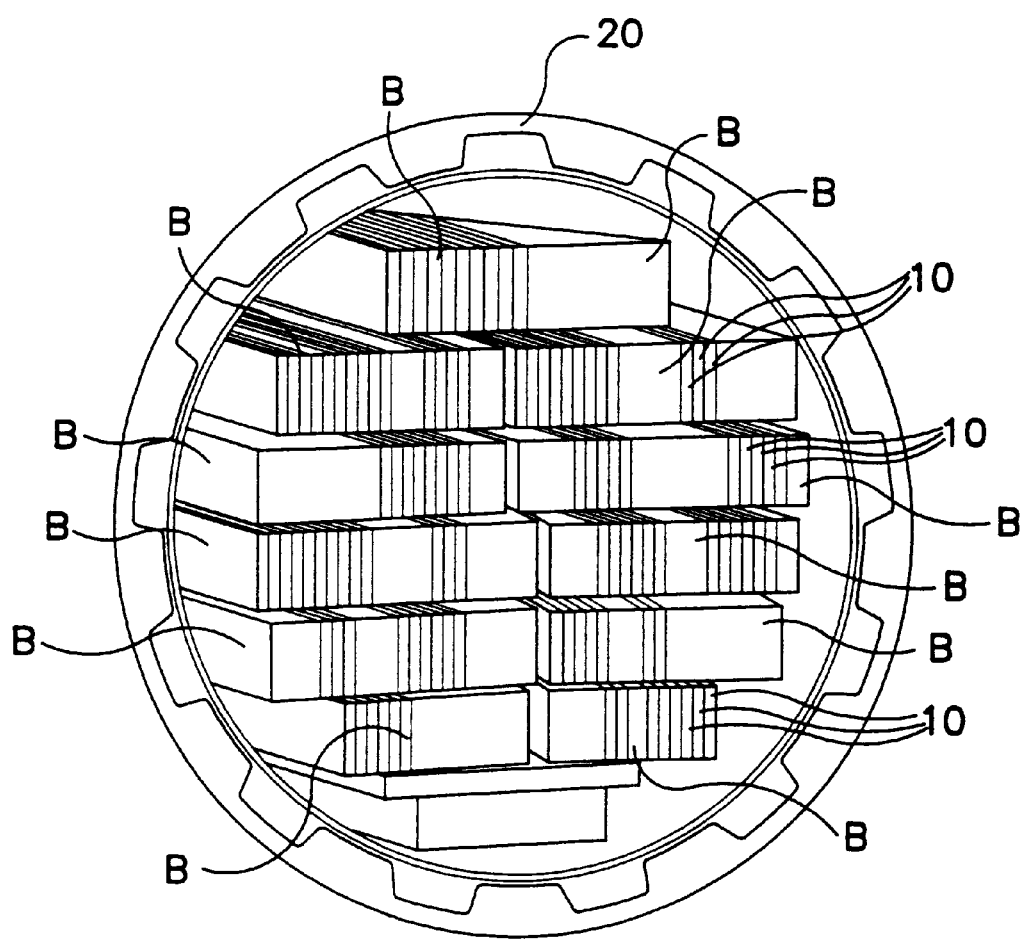
FIG. 2 is a schematic diagram of the manner in which the flooring blanks are bundled in the pressure vessel for carrying out the process.

Referring now specifically to the drawings, a flow diagram illustrating a preferred embodiment of the method according to the present invention is illustrated in FIG. 1. As is shown in FIG. 2, a multitude of hardwood flooring blanks 10 are bundled into densely packed bundles and placed into a pressure reaction vessel 20. The blanks 10 used for purposes of illustration in this application are oak and maple flooring blanks 37 inches long, 5 inches wide and 1/10 inch thick. The reaction vessel 20 has a capacity of 5000 sq. ft. of blanks 10 arranged in bundles as illustrated and described.

Production of 8000 pounds of a blended solution containing MMA and PEG is as follows:

| MATERIAL | PERCENT | POUNDS |
| --- | --- | --- |
| MMA | 67 | 5390 |
| CATALYST NO. 1 | .3 | 2 |
| CATALYST NO. 2 | .07 | 6 |
| CATALYST NO. 3 | .02 | 20 |
| PEG | 25 | 2000 |
| STYPOL | 7 | 560 |
| | 100 | 8000 |

The catalysts are preferably VAZO (a registered trademark of dupont Company) 64, 67 and 88. These polymerization initiators are white crystalline solids that are efficient free radical sources. The grade number refers to the Celsius temperature at which the half-life in solution is ten hours. These catalysts can be used in bulk, solution and suspension polymerizations.

The mixing procedure is as follows:

1. Weigh out and pour catalysts into MMA storage tank.
2. Pump specified amount of Stypol (Styrenated Polyester) into MMA mixing tank.
3. Pump specified amount of PEG into MMA mixing tank.
4. Pump 200 gallons of raw MMA into MMA mixing tank.
5. Mix the three chemicals until blended and pump into MMA storage tank.
6. Pump the remainder of the raw MMA into the MMA storage tank.
7. Mix until homogeneous then sample mixture for stability.

Production of 8278 pounds of a blended solution containing MMA and PEG with wood-staining dyes is as follows:

| MATERIAL | PERCENT | POUNDS |
| --- | --- | --- |
| MMA | 67 | 4855 |
| CATALYST NO. 1 | .3 | 22 |
| CATALYST NO. 2 | .08 | 6 |
| CATALYST NO. 3 | .26 | 19 |
| PEG | 25 | 1819 |
| DYES | .65 | 47 |
| STYPOL | 7 | 509 |
| | 100 | 8000 |

The mixing procedure is as follows:

1. Weigh out and pour catalysts into MMA storage tank.
2. Pump specified amount of Stypol (Styrenated Polyester) into MMA mixing tank.

3. Pump specified amount of PEG into MMA mixing tank.

4. Pump 200 gallons of raw MMA into MMA mixing tank.

5. Mix the three chemicals until blended and pump into MMA storage tank.

6. Pump the remainder of the raw MMA into the MMA storage tank.

7. Mix until homogeneous then sample mixture for stability.

Use of the Stypol (Styrenated Polyester) is optional. A preferred PEG is E-series PEG manufactured by Dow Chemical Company. This PEG is a polymer of ethylene oxide represented by the general formula $HO(CH_2H_2O)_nH$, where "n" represents the average number of oxide units. It is a linear polymer containing two terminal primary hydroxyl groups. The particular PEG preferred is E-600. The "600" represents the approximate average molecular weight. The E-600 PEG is a clear, viscous liquid at room temperature which is soluble in water and organic liquids.

The impregnation cycle varies slightly between maple and oak. A preferred method of the invention when impregnating maple is as follows:

1. Load reactor vessel with maple veneer to be impregnated and secure door.
2. Shut blow off valve and main valve.
3. open vacuum valve and gauge valve.
4. start vacuum pump and turn on vacuum gauge.
5. pull vacuum down to 50 mm.
6. open main valve to pull MMA from MMA storage tank into reactor vessel.
7. close main valve.
8. soak for 30 minutes at 0 pressure.
9. open main valve to blow MMA back into MMA storage tank.
10. close main valve.
11. increase pressure with nitrogen gas to 5 psi and let drain for 30 minutes.
12. open main valve and let remaining MMA drain into MMA storage tank.
13. increase and maintain pressure with nitrogen gas in reactor vessel at 70–80 psi.
14. introduce steam into the heat jacket of the pressurized reactor vessel.
15. leave steam "on" until predetermined cut-off temperature has been reached.
16. bleed pressure from reactor vessel.
17. cool reactor vessel with water.
18. open door and unload reactor vessel.

In the above method additional steam may be introduced to maintain a slow, steady increase in temperature. Temperature rate increase should be maintained so that a temperature of 180° F. is reached within 3.5 to 4 hours. A temperature of 200° F. should not be exceeded. Curing should be complete within 6 to 6.5 hours after introduction of initial steam.

A preferred method of the invention when impregnating oak is as follows:

1. Load reactor vessel with oak veneer to be impregnated and secure door.
2. Shut blow off valve and main valve.
3. open vacuum valve and gauge valve.
4. start vacuum pump and turn on vacuum gauge.
5. pull vacuum down to a minimum of 50 mm.
6. open main valve to pull MMA from MMA storage tank into reactor vessel.
7. close main valve and pressurize reactor vessel with nitrogen to 20 psi.
8. soak for 45 minutes at 20 psi.
9. open main valve to blow MMA back into MMA storage tank.
10. close main valve.
11. increase pressure to 40 psi and let drain for 15 minutes.
12. open main valve and let remaining MMA drain into MMA storage tank.
13. increase and maintain pressure in reactor vessel at 70–80 psi.
14. introduce steam into the heat jacket of the pressurized reactor vessel.
15. leave steam "on" until predetermined cut-off temperature has been reached.
16. bleed pressure from reactor vessel.
17. cool reactor vessel with water.
18. open door and unload reactor vessel.

In the above method additional steam may be introduced to maintain a slow, steady increase in temperature. Temperature rate increase should be maintained so that a temperature of 180° F. is reached within 3.5 to 4 hours. A temperature of 220° F. should not be exeecded. Curing should be complete within 6 to 6.5 hours after introduction of initial steam.

In the above examples the cut-off temperature is determined by outside air temperature, as follows:

| If outside temperature is: | Turn off steam when reactor reaches |
| --- | --- |
| 80° F. or above | 110° F. |
| 60–80° F. | 120° F. |
| 50–60° F. | 130° F. |
| 40–50° F. | 140° F. |
| 40° F. or below | 150° F. |

In a test of the method maple veneers were placed in the first and third racks, oak-maple veneers alternating as is normally loaded, in the second and fourth racks. The reaction temperature reached 184° F., about 30 degrees lower than regular impregnation reactor temperatures.

Maple had a pick-up of 55%, oak 27%, both within the normal range. Maple veneers didn't fall apart from each other when the bundles were released during breakdown of the bundles after impregnation, but were easily separated from each other without significant damage. Only nine veneers of 2,175 were broken during unloading, representing a loss of 0.4%. Normally when maple is impregnated by conventional methods by itself the loss is approximately 50%. When the maple-oak sandwiching technique is used, the loss rate is 3–5%. All loss of maple in this test was a loss along a glue line.

There was no loss of oak. Separation of sandwiched oak-maple was very easy with little effort needed for the task. Normally the loss of oak is from 0.2 to 1%. The veneers appear more flat and more flexible.

Clean up of the reactor was no worse than for a normal run. There was no residue on the upper surface of the reactor only a build up along the bottom and rails.

The Janka hardness was determined by ten measurements on ten separate boards comparing oak and maple processed according to the method of the invention to Regular impregnated oak and maple and to Permagrain Tupelo and Tupelo oak with the following results:

| | |
|---|---|
| Permagrain oak | 366 pounds |
| Hartco regular Impregnated oak | 435 pounds |
| Hartco PEG/Impregnated oak | 406 pounds |
| Hartco regular Impregnated maple | 507 pounds |
| Hartco PEG/Impregnated maple | 486 pounds |

Although there is some loss of hardness of both oak and maple with impregnation with MMA and PEG, it is relatively low. PEG oak retains 93% of the hardness of regular impregnation. Maple retains 96% of the hardness of regular impregnated maple.

Both oak and maple with the PEG treatment have higher hardness values than Permagrain oak and are either roughly equal to or harder than the Permagrain Tupelo.

Veneer treated as described above improves stability by reducing buckling, minimizing surface defects, especially cracks, and reducing cupping and crowning.

A test was conducted by installing edge to edge maple flooring strips processed according to the method of the invention beside regular maple flooring strips and elevating the moisture to observe any differences in swelling. Both sections installed measured 58½" at the beginning of the test and were conditioned in a 20% EMC (Equilibrium Moisture Content) environmental chamber for two weeks. PEG treated maple expanded 0.32% and regular maple expanded 0.86%—a significant difference and a substantial improvement.

Additional tests under the same conditions were conducted with the following results:

| TYPE VENEER | PERCENT EXPANSION |
|---|---|
| Oak, Production, 5 ply | 0.30% |
| Oak, PEG treated, 5 ply | 0.15% |
| Oak, Production, 2-ply | 0.76% |
| Oak, PEG treated, 2 ply | 0.46% |
| Maple, PEG treated, 2-ply | 0.69% |

I claim:

1. A wooden flooring product having a wear surface with enhanced hardness and stability, wherein the enhanced hardness and stability is imparted according to the method comprising the steps of:
   (a) assembling a plurality of wooden veneer flooring product blanks into a bundle of blanks in surface-to-surface contact with each other;
   (b) enclosing the wooden flooring blanks in a pressure vessel;
   (c) evacuating the pressure vessel;
   (d) introducing into the vessel an effective quantity of a non-aqueous monomethylmethacrylate hardening composition for being impregnated into said wooden flooring blanks;
   (e) introducing into the vessel an effective quantity of a polyethylene glycol composition for being impregnated into said flooring blanks to reduce the tendency of the bundle of flooring product blanks to adhere to each other;
   (f) soaking said wooden flooring blanks in said hardening composition and said polyethylene glycol composition for a predetermined period of time;
   (g) removing from the vessel excess amounts of the hardening composition and said polyethylene glycol composition which have not soaked into the flooring blanks;
   (h) applying increased pressure to said wooden flooring blanks to drive said hardening composition and said polyethylene glycol composition into the wooden flooring blanks; and
   (i) adhering the veneer flooring product blanks to a backing material to form the flooring product, whereby the veneer flooring product blank forms the wear surface of the flooring product.

2. A wooden flooring product according to claim 1, wherein the backing material comprises spaced-apart backing blocks.

3. A wooden flooring product according to claim 1, wherein the backing material comprises a solid core wood.

4. A wooden flooring product according to claim 1, wherein the step of soaking said hardwood flooring blanks in said monomethylmethacrylate hardening composition and said polyethylene glycol composition for a predetermined period of time is carried out at greater than atmospheric pressure.

5. A wooden flooring product according to claim 1, wherein said soaking step includes a first step at ambient pressure and a second step at greater than atmospheric pressure.

6. A wooden flooring product according to claim 1, and including the application of steam to the hardwood flooring blanks along with the increased pressure.

7. A wooden flooring product according to claim 1, wherein said hardwood flooring blanks comprise blanks chosen from the group consisting of parquet blocks, veneer strips and solid wood.

8. A wooden flooring product according to claim 1, wherein said hardwood flooring blanks comprise blanks chosen from the group consisting of oak and maple.

9. A wooden flooring product according to claim 1, and including the step of introducing a wood stain into the pressure vessel with the hardening composition for staining the wood blanks while they are hardened.

* * * * *